Patented Sept. 22, 1936

2,054,979

UNITED STATES PATENT OFFICE 2,054,979

POLYCARBOXYLIC ACID ESTERS SUITABLE AS SOFTENING AND GELATINIZING AGENTS AND THEIR PRODUCTION

Michael Jahrstorfer and Hans Georg Hummel, Mannheim, Germany, assignors to I. G. Farbenindustrie Aktiengesellschaft, Frankfort-on-the-Main, Germany No Drawing. Application July 1, 1932, Serial No. 620,536. In Germany July 13, 1931

12 Claims. (Cl. 260—106)

The present invention relates to the production of softening and gelatinizing agents.

We have found that excellent softening and gelatinizing agents can be obtained by an esterification of polycarboxylic acids derived from the products of the liquid phase oxidation of aliphatic, that is open chain and cycloaliphatic hydrocarbons of high molecular weight and their oxygen-bearing derivatives, e. g. oxygenated substitution products of such hydrocarbons, or fractions of such oxidation products, especially those having an acid value of more than 400, or mixtures which contain a preponderating quantity of the said poly-carboxylic acids, with organic hydroxyl-bearing compounds selected from the group consisting of aliphatic, cycloaliphatic and aliphatic-aromatic mono- or poly-hydric alcohols, hydroxyl-bearing ethers of polyhydric alcohols, amino-alcohols and phenols. Castor oil, hydroxy-stearic or ricinoleic acids are not employed since they give products different from those obtainable with the said organic hydroxyl-bearing compounds. For the preparation of the said esters, oxidation products or fractions thereof, of paraffin hydrocarbons of high molecular weight, i. e. containing at least 12, generally 18 and more carbon atoms, especially mixtures thereof as for example hard or soft paraffin wax and paraffin oil, or fractions containing the same, such as paraffin-bearing mineral oil fractions of high boiling point, such as above 200° C. at normal pressure, which initial materials are oxidized to a great extent, such as up to 70 or 80 per cent and which contain at least 10 per cent of polycarboxylic acids or which consist thereof, are suitable. These products may be obtained by the oxidation of aliphatic or cycloaliphatic hydrocarbons of high molecular weight, as for example paraffin wax or paraffin oil, crude mineral oils or mineral oil distillates of high boiling point and fractions of high molecular weight of hydrogenation products of coals or tars. Similar oxidation products can be obtained from the beforementioned oxygen-bearing derivatives of the hydrocarbons and especially from mixtures thereof such as the different fatty materials as for example fats, waxes and oils of vegetal, i. e. vegetable and animal origin, the corresponding fatty acids, alcohols, aldehydes, hydroxy-aldehydes, ketones, hydroxy-ketones and hydroxy-fatty acids and residues occurring in working these materials as for example distillation residues.

The liquid phase oxidation may be carried out in any suitable manner known to yield polycarboxylic acids, as for example by means of oxygen or gases containing oxygen or, preferably, by means of nitric acid and/or of oxides of nitrogen as for example according to the British Patent No. 324,492. The oxidation of fats, their acids or of the beforementioned residues may be carried out with about equal quantities of a from about 40 to about 45 per cent aqueous nitric acid while warming for several hours for example to a temperature of about 85° C. The concentration of the nitric acid, which decreases during the oxidation, is preferably maintained approximately at the initial value for example by adding a nitric acid of higher strength or by introducing nitrous gases. On cooling the reaction mixture, the polycarboxylic acids separate out and can be isolated in any suitable and convenient manner, as for example by filtration or centrifuging. The oxidation is preferably carried out so that products are directly obtained which have a high acid value, mono-carboxylic acids being separated off, if necessary, for example by fractional distillation, fractional crystallization from solvents or several of such measures. Oxidation products having a high acid value may also be obtained by separating off the fraction of constituents having a low acid value from less highly oxidized products and, if desired, isolating from the fraction of high acid value the constituents which are insoluble in petroleum ether and difficultly soluble in cold water but soluble in hot water. These polycarboxylic acid mixtures apparently consist mainly of α,ω-di-carboxylic acids containing from about 8 to 20 carbon atoms.

The said oxidation products, in so far as they contain impurities, for example of resinous nature, or unsaponifiable constituents, are preferably subjected to a previous purification, for example by dissolution in the alcohol intended for esterification and separation of insoluble matter. The esterification is carried out in the usual manner, i. e. preferably with an excess of hydroxyl bearing compound, boiling under reflux and addition of a small quantity of a strong acid, such as sulphuric acid. Alcohols suitable for the esterification are for example methyl, ethyl, propyl, isopropyl or butyl alcohols, lauryl and octodecyl alcohol and the like, ethylene or propylene glycols, glycerine, 1.3-butylene glycol, diethylene glycol, mono-alkyl ethers of glycols, such as ethylene glycol mono-ethyl ether, amino-alcohols, such as mono-, di- or tri-ethanol or propanol amines, cyclohexanol and its homologues, benzyl alcohol, phenols and the like. When esterifying acids of high acid value, i. e. above 400, with polyhydric alcohols it is preferable so to select the working conditions that substantially only an esterification with one hydroxyl group of the polyhydric alcohol takes place, as for example by causing the alkali metal salts of the polycarboxylic acids to react with the corresponding halogen hydrins, such as ethylene glycol- or other alpha-chlorhydrins. Similarly the polycarboxylic acids, or products containing the same may be reacted with alkylene oxides such as ethylene, propylene or butylene oxides.

The non-esterified alcohol is usually removed by distillation. In many cases it may be advantageous to leave the remainders of free alcohol in the product, for example when the product is intended for addition to nitrocellulose lacquers, as for example normal or iso-butanol which may be ester components of the softening agent and act as solvents in the said lacquers. As a rule it is advantageous, however, to purify the esters prepared in the said manner by a subsequent distillation or fractionation.

The said non-resinous esters are usually colorless and odorless liquids which even at high temperatures, as for example 100° C. have almost no vapor tension and therefore surpass the usual softening agents, such as tri-aryl phosphates and di-alkyl phthalates such as di-ethyl and di-normal-butyl phthalates as regards difficult volatility. Almost without exception they solidify only at temperatures about 10° or 20° below zero centigrade to form soft white products.

Lacquers, films and other more or less plastic or plastifiable masses, for example from water-insoluble cellulose derivatives, such as nitro- or acetyl-cellulose, resins, such as urea-formaldehyde resins or other organic film-forming substances, prepared with an addition of the esters of high boiling point according to the present invention are distinguished by excellent elasticity and stability to light and cold and are superior in these respects to most of the products hitherto known. The gelatinizing power of the esters is almost as good as that of camphor from which they advantageously differ by their odorlessness and their smaller volatility and especially by their low inflammability. The esters are usually employed in quantities of from 5 to 150 per cent of the said film-forming substances depending on the desired field of application of the mixtures.

The following examples will further illustrate the nature of this invention, but the invention is not restricted to these examples. The parts are by weight.

Example 1

500 parts of an oxidation product of paraffin wax, having an acid value of 520.8 and prepared with the aid of nitric acid and separation of constituents having an acid value below 400, together with 1000 parts of isobutyl alcohol with an addition of 3 parts of 70 per cent sulphuric acid are boiled for 7 hours under a reflux condenser while stirring. The remainders of isobutyl alcohol which have not reacted are distilled off at atmospheric pressure at 120° C. and the residue is subjected to fractional distillation under reduced pressure. At from 170° to 230° C. at a pressure of from about 1 to about 2 millimeters (mercury gauge) a colorless and odorless neutral ester distils over in a yield of 600 parts. The ester has only a very slight volatility, 2.2 per cent being evaporated at 100° C. in about 24 hours.

50 parts of this ester are added to 500 parts of a 20 per cent solution of a nitrocellulose, the solutions of which show low viscosity, in a mixture of equal parts of normal- or iso-butyl acetate, normal- or iso-butanol and toluene. A lacquer is obtained which gives clear elastic films and coatings on glass or sheet metal.

Example 2

250 parts of the oxidation product of paraffin wax employed in Example 1 are esterified as described in Example 1 with 500 parts of normal butyl alcohol. When distilling the reaction mixture, 262 parts of a water-clear odorless ester pass over between 190° and 230° C. at a pressure of from 6 to 7 millimeters (mercury gauge). The ester has the same good properties as the isobutyl ester obtained according to Example 1 and may likewise be used as a softening agent.

Example 3

100 parts of an oxidation product of paraffin wax, having an acid value of 564.2 and prepared with the aid of nitric acid, are esterified with 200 parts of ethylene glycol monoethyl ether with an addition of 0.5 part of 90 per cent sulphuric acid. At from 190° to 230° C. at a pressure of from 1 to 2 millimeters, 109 parts of an almost colorless, pale yellow colored liquid pass over. By subsequent treatment with 10 per cent by weight of bone black it is possible to obtain the ester colorless and odorless. The ester may be advantageously used as a camphor substitute in the preparation of shaped articles from nitrocellulose and the like.

Example 4

100 parts of an oxidation product of paraffin wax, having an acid value of 508, are heated for 7 hours at 120° C. with 200 parts of para-methyl-cyclohexanol and 0.5 part of concentrated sulphuric acid. During the subsequent distillation, under a pressure of from 1 to 2 millimeters, 110 parts of an almost colorless, odorless liquid boiling between 216° and 245° C., pass over, which by treatment with decolorizing carbon is rendered entirely colorless. The product is eminently suitable as a softening agent in solutions of nitrocellulose or of artificial resins, such as urea-formaldehyde resins, which are to be employed for the preparation of non-splintering glass.

Example 5

60 parts of a highly oxidized product, having an acid value of 519.4 and obtained by the action of an about 45 per cent aqueous nitric acid on an about equal quantity of slaughterhouse waste fat at about 85° C. for several hours are refluxed for 12 hours with 100 parts of iso-propyl alcohol and 1 part of a 50 per cent aqueous sulphuric acid solution, water formed and remainders of the alcohol being then removed by distillation. For neutralizing free acid the residue is stirred with pulverulent calcium hydroxide for ½ hour at 80° C. whereupon the whole is subjected to distillation in vacuo. From 165° to 215° C. at from 4 to 5 millimeters (mercury gauge) 64 parts of a slightly yellowish, neutral liquid are distilled off. By a treatment with decolorizing carbon the ester can be obtained in a completely colorless and odorless state.

By mixing 100 parts of a nitrocellulose, giving solutions of low viscosity, 200 parts of butyl acetate, 200 parts of toluene, 200 parts of butanol and 75 parts of the ester, a solution is obtained which furnishes clear elastic films or coatings which are highly fast to light.

Example 6

100 parts of a product having an acid value of 406 and obtained by oxidizing train oil fatty acids with the aid of a from 45 to 50 per cent aqueous nitric acid while maintaining its concentration by introducing nitrous gases, are heated with 100 parts of ethylene glycol mono-methyl ether and 2.5 parts of a 50 per cent aqueous sulphuric acid. After washing and drying, a product is obtained from which, by distillation in vacuo, a yellow liquid, having an acid value of 9.8 and boiling of from 180° to 250° C. at 2 millimeters (mercury gauge), is obtained in a yield of 110 parts. For the production of a neutral ester, the liquid is rendered neutral with the aid of lime, and the neutral ester extracted with the aid of gasoline in which the calcium soaps are insoluble. After distilling off the benzine and distillation in vacuo, a colorless and odorless ester is obtained which shows practically no vapor tension at 100° C. and may find useful application for a gelatinizing agent in the production of celluloid articles and the like.

Example 7

100 parts of a mixture of acids, having an acid value of 417.2 and obtained by oxidizing in the manner described in the foregoing example the residues of a distillation obtainable by splitting olive oil foots (i. e. converting the oil into the free fatty acids and glycerine) and distilling off the free fatty acids by means of steam according to the U. S. Patent No. 1,622,126 and the British Patent No. 213,267, are esterified with 130 parts of cyclohexanol in the manner described in Example 6. 120 parts of a yellow liquid, having an acid value of 28 and a boiling point of from 200° to 260° C. at 2 millimeters (mercury gauge), are obtained which after purification by stirring with calcium hydroxide until the acid value is reduced to zero, grinding in a ball mill with benzine, filtering off the calcium soaps insoluble in benzine and distilling off the benzine and distilling the remainders in vacuo, furnish a colorless and odorless, neutral ester. The ester is a useful softening agent for use in nitrocellulose lacquers.

Example 8

50 parts of a product of the liquid phase oxidation of paraffin wax, which product has an acid value of 420, are heated under reflux with 100 parts of a mixture of oxides, consisting mainly of n-hexylene oxide and obtained from an olefine mixture prepared by thermal cracking of paraffin, until the acid value is reduced to zero. After distilling off constituents volatilized up to about 200° C. at atmospheric pressure, a yellow liquid is obtained by distillation at from 220° to 260° C. at 3 millimeters of mercury. The free hydroxyl groups of the monoglycol esters can be acylated in known manner, if so desired. The products may find useful application for gelatinizing acetyl-cellulose.

Example 9

50 parts of a mixture of polycarboxylic anhydrides, obtained by heating an oxidation product as described in Example 8 but having an acid value of 504 with acetic anhydride, are heated with 100 parts of phenol for several hours to from 130° to 140° C. After removal of remainders of phenol by distillation in vacuo and bleaching the residue with animal charcoal, a yellow, soft mass having a melting point of 40° C. is obtained.

What we claim is:—

1. The process for the production of softening and gelatinizing agents, which comprises esterifying polycarboxylic acids, derived from the products of the liquid phase oxidation of aliphatic compounds, selected from the group consisting of aliphatic hydrocarbons containing at least 12 carbon atoms and oxygenated substitution products thereof, with organic hydroxyl-bearing compounds selected from the group consisting of aliphatic, cycloaliphatic and aliphatic-aromatic mono- or polyhydric alcohols, hydroxyl-bearing ethers of polyhydric alcohols, amino-alcohols and phenols.

2. The process for the production of softening and gelatinizing agents, which comprises esterifying polycarboxylic acid, having an acid value above 400 and derived from the products of the liquid phase oxidation of aliphatic compounds, selected from the group consisting of aliphatic hydrocarbons containing at least 12 carbon atoms and oxygenated substitution products thereof, with organic hydroxyl-bearing compounds selected from the group consisting of aliphatic, cycloaliphatic and aliphatic - aromatic mono- or polyhydric alcohols, hydroxyl-bearing ethers of polyhydric alcohols, amino-alcohols and phenols.

3. Esters, suitable as softening and gelatinizing agents, of polycarboxylic acids, derived from the products of the liquid phase oxidation of aliphatic compounds, selected from the group consisting of aliphatic hydrocarbons containing at least 12 carbon atoms and oxygenated substitution products thereof, with organic hydroxyl-bearing compounds selected from the group consisting of aliphatic, cycloaliphatic and aliphatic-aromatic mono- or polyhydric alcohols, hydroxyl-bearing ethers of polyhydric alcohol, amino-alcohols and phenols.

4. Esters, suitable as softening and gelatinizing agents, of polycarboxylic acids, having an acid value above 400 and derived from the products of the liquid phase oxidation of aliphatic compounds, selected from the group consisting of aliphatic hydrocarbons containing at least 12 carbon atoms and oxygenated substitution products thereof, with organic hydroxyl-bearing compounds selected from the group consisting of aliphatic, cycloaliphatic and aliphatic-aromatic mono- or polyhydric alcohols, hydroxyl-bearing ethers of polyhydric alcohols, amino-alcohols and phenols.

5. Esters, suitable as softening and gelatinizing agents, of polycarboxylic acids, having an acid value above 400 and derived from the products of the liquid phase oxidation of aliphatic hydrocarbons containing at least 12 carbon atoms with the aid of at least one of the nitrogenous oxidizing agents selected from the group consisting of nitric acid and nitrogen oxides, with organic hydroxyl-bearing compounds selected from the group consisting of aliphatic, cycloaliphatic and aliphatic-aromatic mono- or polyhydric alcohols, hydroxyl-bearing ethers of polyhydric alcohols, amino alcohols and phenols.

6. Esters, suitable as softening and gelatinizing agents, of polycarboxylic acids, having an acid value above 400 and derived from the products of the liquid phase oxidation of aliphatic fatty materials with aliphatic alcohols.

7. Esters, suitable as softening and gelatinizing agents, of polycarboxylic acids, having an acid value above 400 and derived from the products of the liquid phase oxidation of paraffin, with aliphatic alcohols.

8. Esters, suitable as softening and gelatinizing agents, of polycarboxylic acids, derived from the products of the liquid phase oxidation of paraffin wax, with isobutyl alcohol.

9. Esters, suitable as softening and gelatinizing agents, of polycarboxylic acids, having an acid value of about 520, derived from the products of the liquid phase oxidation of paraffin wax, with isobutyl alcohol.

10. Esters, suitable as softening and gelatinizing agents, of polycarboxylic acids, derived from the products of the liquid phase oxidation of paraffin wax, with paramethylcyclohexanol.

11. Esters, suitable as softening and gelatinizing agents, of polycarboxylic acids, having an acid value of above 400, derived from the products of the liquid phase oxidation of a residue obtainable by splitting olive oil foots and distilling off the free fatty acids.

12. Esters, suitable as softening and gelatinizing agents, of polycarboxylic acids, derived from the products of the liquid phase oxidation of fatty acids corresponding to oils of vegetal origin with organic hydroxyl-bearing compounds selected from the group consisting of aliphatic, cycloaliphatic and aliphatic-aromatic mono- or polyhydric alcohols, hydroxyl-bearing ethers of polyhydric alcohols, amino-alcohols and phenols.

MICHAEL JAHRSTORFER.
HANS GEORG HUMMEL.